United States Patent
Fujinami

(10) Patent No.: US 7,525,966 B2
(45) Date of Patent: Apr. 28, 2009

(54) WIRELESS COMMUNICATION SYSTEM FOR MULTICAST COMMUNICATIONS

(75) Inventor: Makoto Fujinami, Minato-ku (JP)

(73) Assignee: NEC Corporation, Tokyo (JP)

( * ) Notice: Subject to any disclaimer, the term of this patent is extended or adjusted under 35 U.S.C. 154(b) by 390 days.

(21) Appl. No.: 11/316,191

(22) Filed: Dec. 23, 2005

(65) Prior Publication Data

US 2006/0140187 A1 Jun. 29, 2006

(30) Foreign Application Priority Data

Dec. 27, 2004 (JP) ............... 2004-376766

(51) Int. Cl.
*H04L 12/56* (2006.01)
(52) U.S. Cl. .................. 370/390; 370/449
(58) Field of Classification Search ............ 370/346, 370/390, 392, 432, 449
See application file for complete search history.

(56) References Cited

U.S. PATENT DOCUMENTS

2005/0089036 A1* 4/2005 Lee et al. ............ 370/390

FOREIGN PATENT DOCUMENTS

| JP | 10-173653 A | 6/1998 |
|---|---|---|
| JP | 2002-330101 A | 11/2002 |
| JP | 2003-134118 A | 5/2003 |
| JP | 2003-244163 A | 8/2003 |
| JP | 2004-511127 A | 4/2004 |
| WO | WO 02/27989 A1 | 4/2002 |

* cited by examiner

*Primary Examiner*—Sam Bhattacharya
(74) *Attorney, Agent, or Firm*—Sughrue Mion, PLLC

(57) ABSTRACT

A wireless LAN system uses an address that is used by another device than terminals connected to a wireless LAN, as a multicast destination address. An access point sets an address that is used by another device than terminals connected to a wireless LAN of its own, as a multicast destination address. The access point generates a unique multicast frame, which is to be discarded by an ordinary terminal, with the multicast destination address set as a destination address according to a standard frame format, and sends the generated unique multicast frame through a wireless link. A special terminal stores the multicast destination address in advance. The special terminal receives a frame from the access point as a unique multicast frame if the multicast destination address is set as a destination address of the frame.

19 Claims, 12 Drawing Sheets

Fig. 4a

| frame control | duration /ID | address 1 | address 2 | address 3 | sequence control | address 4 | frame body | FCS |

Fig. 4b

| Frame Type: Beacon | duration /ID | DA | SA | BSS ID | sequence control | frame body | FCS |

Fig. 4c

| Frame Type: Data | duration /ID | FF:FF:FF: FF:FF:FF | SA | address 3 | sequence control | frame body | FCS |

Fig. 5a

| Frame Type: Data | duration /ID | DA= AP | SA= AP | address 3 | sequence control | frame body | FCS |
|---|---|---|---|---|---|---|---|

Fig. 5b

| Frame Type: Beacon | duration /ID | DA= AP | SA= AP | BSSID | sequence control | frame body | FCS |
|---|---|---|---|---|---|---|---|

Fig. 6

| Frame Type: Data | duration /ID | DA(RA) =AP | TA=AP (BSSID) | SA | sequence control | frame body | FCS |
|---|---|---|---|---|---|---|---|

WIRELESS COMMUNICATION SYSTEM FOR MULTICAST COMMUNICATIONS

BACKGROUND OF THE INVENTION

1. Field of the Invention

The present invention relates to a wireless communication system for multicast communications.

2. Description of the Related Art

The widespread use of wireless LANs has made the communication environments much more convenient than when only wired LANs were used. Particularly, wireless LANs are more suitable to broadcast communications and multicast communications than wired LANs because radio waves from an access point reach all terminals that are positioned in the communication range from the access point. Communications with all terminals in the communication range will be referred to as broadcast communications, and communications with certain terminals in the communication range will be referred to as multicast communications.

Wireless LANs employ a packet communication system wherein the destination of each packet is indicated by a destination address. For making broadcast or multicast communications possible, it is necessary to prepare a broadcast or multicast address and set it for each terminal in addition to the address inherent in each terminal.

Regardless of whether terminals belong to a wired LAN or a wireless LAN, each of the terminals initially has two MAC addresses, i.e., an inherent address and a broadcast address. The broadcast address is commonly used by all the terminals, and comprises 48 bits each represented by "1". Each terminal receives only packets having its own inherent address or the broadcast address as the destination address, and discards other packets. In this manner, each terminal avoids the reception of unwanted packets.

For multicast communications, it is necessary for each terminal to select, in addition to the inherent address and the broadcast address that are initially set, a MAC address that is not the same as those of any other terminals, and use the selected MAC address as a multicast address.

According to the standards of IEEE802.11, a multicast address is defined. If a multicast address is used in a system, it is necessary to guarantee by some means that the same multicast address is not used in other systems. Therefore, basically, centralized management is indispensable with regards to the allocation of multicast addresses, and individual systems are not allowed to select and use multicast addresses at their discretion.

There has heretofore been proposed a process of generating multicast addresses that do not overlap inherent addresses and broadcast addresses of terminals (see, for example, JP-A-2003-134118).

According to the processed disclosed in JP-A-2003-134118, a hypothetical MAC address for use as a multicast address is generated using a vendor code that is not supposed to be used under normal circumstances. The process makes it possible to generate multicast addresses that do not overlap inherent addresses and broadcast addresses of terminals.

However, the conventional process suffers the following problems:

Some terminals that are available at present allow a MAC address to be set manually. According to the processed disclosed in JP-A-2003-134118, there is a possibility that a generated hypothetical MAC address, though it contains a vendor code that is not supposed to be used, may overlap a MAC address that is actually used in the network.

The Ethernet may be used to perform multicast communications. However, Ethernet multicast communications are basically to be used in cooperation with IP multicast communications. Though Ethernet multicast communications are defined according to standards, they may possibly be implemented in various forms as they are used less frequently. It is doubtful if the Ethernet multicast scheme can be applied to wireless LANs or not.

According to specifications of wireless LANs, a multicast frame format is defined separately from a broadcast beacon frame format. Such a multicast frame format may be used for multicast communications. However, only the multicast frame format is defined, and specific details are not given about how to establish multicast groups. Consequently, it is uncertain whether currently installed functions are capable of performing multicast communications or not.

Multicast communications may be accomplished based on the fact that there are terminals which are capable of receiving beacon frames and broadcast frames of the ordinary data type and terminals which are incapable of receiving such beacon frames and broadcast frames. If a terminal that is capable of receiving beacon frames and broadcast frames of the ordinary data type is used as a multicast communication destination, then it is possible to perform communications with certain terminals. However, various terminals that are incapable of receiving such beacon frames and broadcast frames may possibly be caused to malfunction by those frames.

As described above, the conventional wireless LANs require some centralized management for setting multicast addresses and may possibly adversely affect other systems and terminals. Therefore, the conventional wireless LANs have not effectively be utilized to perform multicast communications that are suitable for use as wireless communications.

SUMMARY OF THE INVENTION

It is an object of the present invention to provide a wireless LAN system which does not require central management for multicast addresses and which is capable of performing multicast communications without essentially adversely affecting other systems and terminals.

To achieve the above object, a wireless LAN system for multicast communications according to the present invention has an access point and a special terminal.

The access point uses an address that is used by another device than terminals connected to a wireless LAN of its own as a multicast destination address in the wireless LAN. The access point generates a unique multicast frame, which is to be discarded by an ordinary terminal, with the multicast destination address set as a destination address according to a standard frame format, and sends the generated unique multicast frame through a wireless link.

The special terminal stores the multicast destination address in advance. If the multicast destination address is set as a destination address of a frame sent from the access point, then the special terminal receives the frame from the access point as a unique multicast frame.

According to the present invention, since the access point sets the address that is used by another device than terminals connected to the wireless LAN of its own as the destination address, centralized management for avoiding multicast address overlaps is not required. In addition, inasmuch as the access point sends a unique multicast frame according to the standard frame format, and the special terminal which stores the multicast destination address in advance receives the unique multicast frame, ordinary terminals are prevented from being adversely affected.

The above and other objects, features, and advantages of the present invention will become apparent from the following description with reference to the accompanying drawings which illustrate examples of the present invention.

BRIEF DESCRIPTION OF THE DRAWINGS

FIGS. 4a through 4c are diagrams showing frame formats according to IEEE802.11;

FIGS. 5a and 5b are diagrams showing frame formats for multicast frames;

FIG. 6 is a diagram showing another frame format for a multicast data frame;

DETAILED DESCRIPTION OF THE PREFERRED EMBODIMENTS

Figure 1:
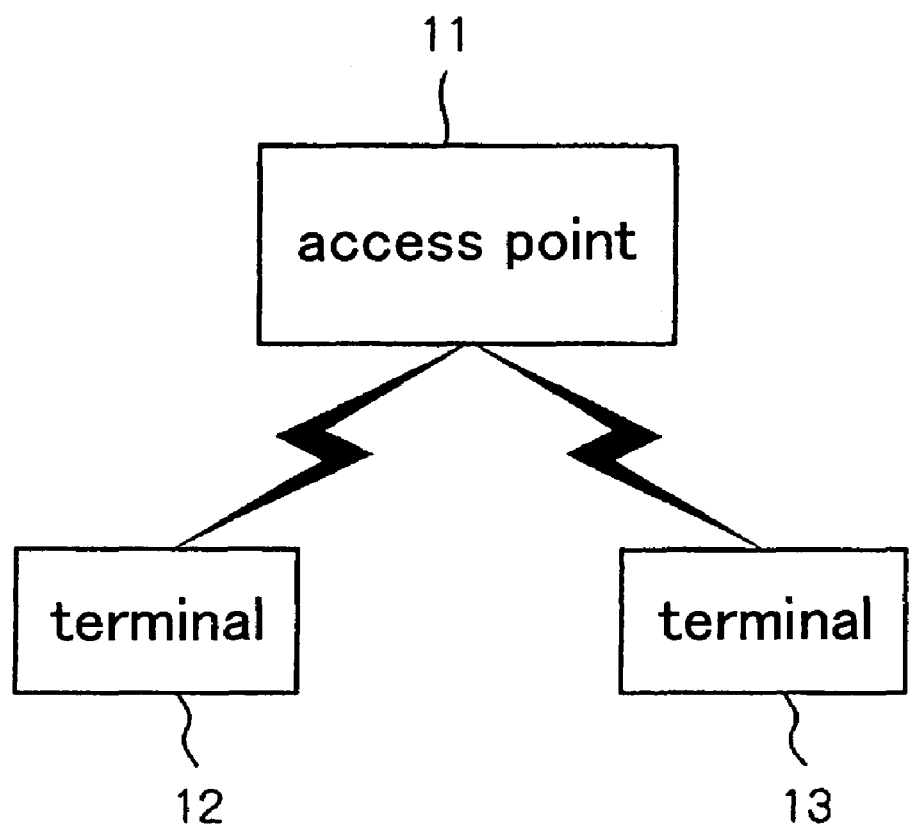
FIG. 1 is a block diagram of a wireless LAN system according to an embodiment of the present invention.

As shown in FIG. 1, a wireless LAN system according to an embodiment of the present invention has access point 11, terminal 12, and terminal 13.

In the wireless LAN system, only access point 11 and terminal 13 have a function for performing multicast communications unique to the wireless LAN system, and terminal 12 does not have such a function. Using the function, access point 11 and terminal 13 perform multicast communications to send frames from access point 11 to terminal 13. Terminal 12 which does not have such a function to perform multicast communications does not receive multicast frames.

Access point 11 is a device serving as a junction between a wireless LAN and a wired network. Access point 11 is connected to the terminals through wireless links and allows the terminals to use the wireless LAN. Access point 11 is also capable of performing multicast communications unique to the wireless LAN system.

For multicast communications, access point 11 uses, as destination addresses, MAC addresses that are used by other devices than terminals that are connected to the wireless side of access point 11. Therefore, inherent addresses and broadcast addresses of the terminals connected to the wireless LAN of access point 11 and multicast addresses do not possibly overlap each other. For example, a MAC address on the wireless side of access point 11, a MAC address on the wired side of access point 11, or a MAC address of another device that access point 11 can acquire from the wired side may preferably be used as a multicast address. Access point 11 itself can determine a multicast address without the need for the user to manually enter a multicast address.

For example, a multicast address may be sent in advance from access point 11 to a terminal which is capable of recognizing multicast communications unique to the present wireless LAN system. According to IEEE802.11, a MAC address on the wireless side of access point 11 is sent in a BSSID (Basic Service Set ID) in a beacon. Consequently, if this MAC address is used as a multicast address, then a terminal which is capable of recognizing multicast communications may acquire a multicast address from the BSSID field. The beacon refers to a management frame which is transmitted in certain cyclic periods by access point 11, and contains various items of information.

According to another example, a multicast address may be set in advance by the user for a terminal which is capable of recognizing multicast communications.

For multicast communications, access point 11 uses a standard frame format according to IEEE802.11. A frame may be anything though it may be a beacon frame or a data frame. Since a standard frame format is used as a multicast frame, an existing terminal which is not capable of recognizing multicast communications simply discards the multicast frame as it does not agree with its own inherent address or a broadcast address, and hence does not malfunction.

Terminal 12 is an ordinary terminal which is not capable of recognizing multicast communications unique to the present wireless LAN system. Terminal 12 receives frames having its own inherent address or a broadcast address as a destination address, and discards frames having other destination addresses. Therefore, terminal 12 discards multicast frames.

Terminal 13 is a special terminal which is capable of recognizing multicast communications. As with terminal 12, terminal 13 receives frames having its own inherent address or a broadcast address as a destination address. Terminal 13 stores a multicast address, and also receives frames having the multicast address as a destination address.

As described above, a multicast address may be sent from access point 11 to terminal 13, or may be manually set by the user. If a multicast address is sent from access point 11 to terminal 13, then terminal 13 receives the multicast address sent from access point 11, and stores the received multicast address. For example, if a MAC address on the wireless side of access point 11 is used as a multicast address, then terminal 13 may record the BSSID field in the beacon in which the MAC address is described.

Figure 2:
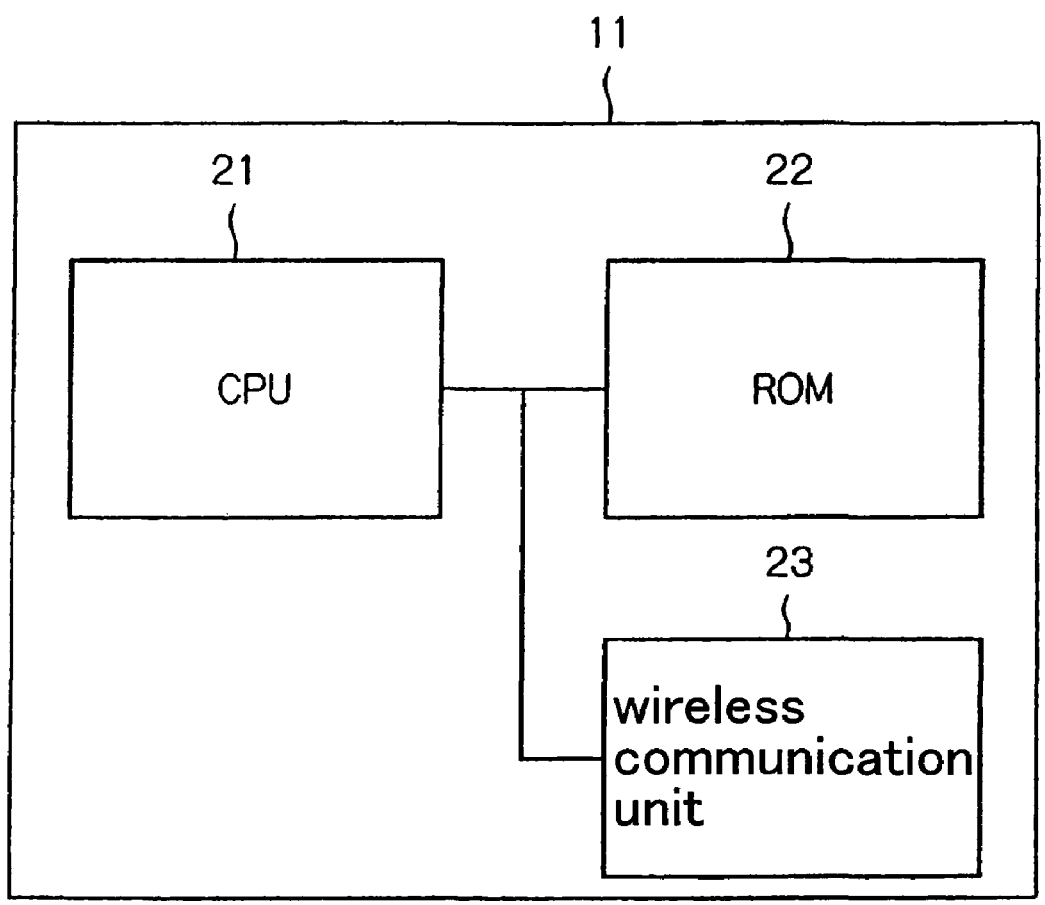
FIG. 2 is a block diagram showing a physical structure of an access point according to the embodiment.

FIG. 2 shows in block form a physical structure of access point 11 according to the embodiment. As shown in FIG. 2, access point 11 has CPU 21, ROM 22, and wireless communication unit 23. CPU 21 controls access point 11 in its entirety by executing a program. ROM 22 stores the program that is executed by CPU 21. Wireless communication unit 23 performs wireless communications with terminals 12, 13 under the control of CPU 21. Access point 11 thus operates under the control of CPU 21.

Figure 3:
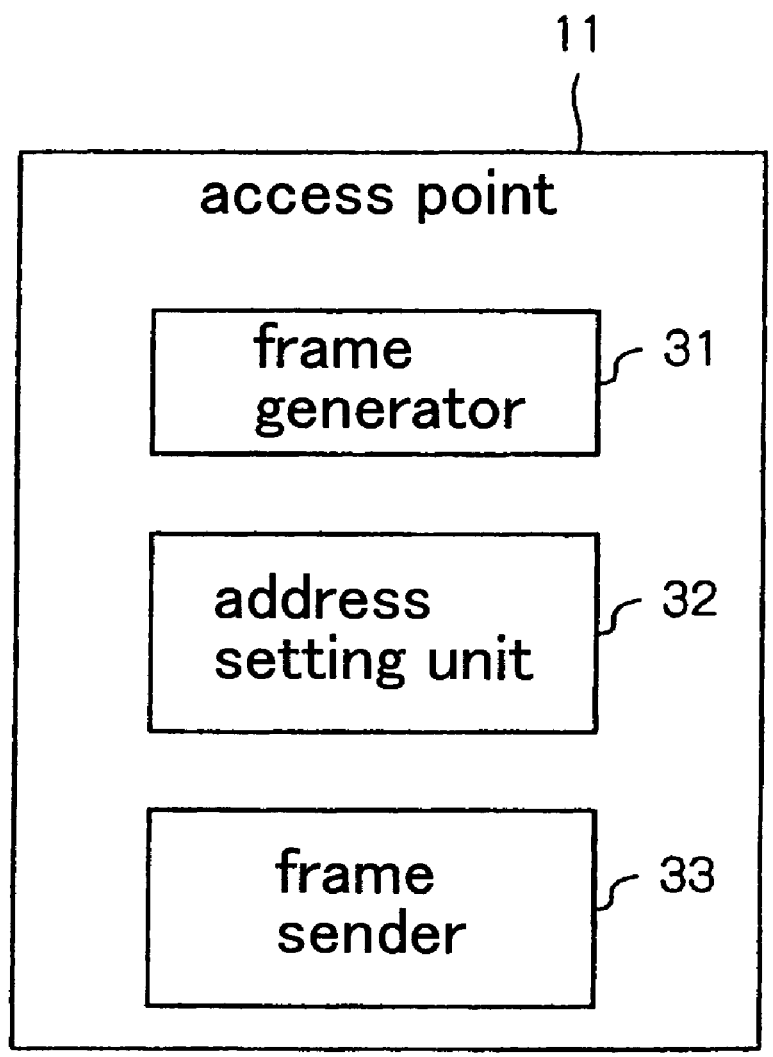
FIG. 3 is a block diagram showing a functional structure of the access point according to the embodiment.

FIG. 3 shows in block form a functional structure of access point 11 according to the embodiment. As shown in FIG. 3, access point 11 has frame generator 31, address setting unit 32, and frame sender 33.

Frame generator 31 generates a frame to be sent to the wireless side in the standard frame format according to IEEE802.11. A frame may be a beacon frame or a data frame.

Address setting unit 32 sets an address for a frame that is generated by frame generator 31.

FIGS. 4a through 4c show frame formats according to IEEE802.11.

FIG. 4a shows a general frame format. The general frame format includes fields representing frame control, duration ID, address 1, address 2, address 3, sequence control, address 4, frame body, and FCS (Frame Check Sequence) in the order named from its beginning end.

The frame control field indicates a frame type such as a beacon frame or a data frame.

The duration ID field is a field for indicating a period of time for using a wireless frequency, and is used to adjust frame transmission timing.

The fields representing addresses 1 through 4 are fields for setting various addresses.

The sequence control field is a field used to secure a frame sequence.

The frame body field is a field containing data to be sent by the frame.

The FCS field is a field used to detect errors.

FIG. 4b shows a frame format of a beacon frame. The beacon frame has a frame control field representing a beacon as a frame type. The beacon frame also has a destination address (DA) set as address 1, a source address (SA) as address 2, and BSSID as address 3. The beacon frame has not field of address 4.

FIG. 4c shows a frame format of a data frame. In FIG. 4c, the data frame is a broadcast data frame. The data frame has a frame control field representing data as a frame type. The data frame has a source address (SA) as address 2. Since the data frame is a broadcast data frame, a broadcast address (all bits set to "1") as a destination address is set as address 1.

As shown in FIGS. 4a through 4c, the beacon frame and the data frame need different addresses. Address setting unit 32 sets addresses required by the respective frames. A multicast frame may be a data frame or a beacon frame insofar as it has a multicast address as a destination address.

For a multicast frame, address setting unit 32 sets a MAC address used by another device than terminals connected to the wireless side of its own, as a destination address. For example, it may be a MAC address on the wireless side of access point 11, a MAC address on the wired side of access point 11, or a MAC address of a device connected to the wired side of access point 11.

FIGS. 5a and 5b show frame formats for multicast frames.

FIG. 5a shows a frame format which is similar to the data frame format shown in FIG. 4c except that a multicast address is set as the destination address (DA). Therefore, the frame format represents a multicast data frame. A MAC address used by another device than terminals connected to the wireless side of access point 11 may be set as the multicast address. In FIG. 5a, a MAC address (AP) on the wireless or wired side of access point 11 itself.

FIG. 5b shows a frame format which is similar to the beacon frame format shown in FIG. 4b except that a multicast address is set as the destination address (DA). Therefore, the frame format represents a multicast beacon frame. A MAC address used by another device than terminals connected to the wireless side of access point 11 may be set as the multicast address. In FIG. 5b, a MAC address on the wireless or wired side of the access point (AP) itself.

FIG. 6 shows another frame format for a multicast data frame. As shown in FIG. 6, a MAC address (AP) of access point 11 itself as a multicast address is set as the destination address (DA).

Referring back to FIG. 3, address setting unit 32 stores in advance a MAC address to be set. The MAC address may be manually be set by the user, or may be acquired from the network by access point 11. Alternatively, a MAC address stored in access point 11 itself may directly be used insofar as it is a MAC address on the wireless side or wired side thereof.

Frame sender 33 sends, through a wireless link, frames that are generated by frame generator 31 and have addresses set by address setting unit 32.

Figure 7:
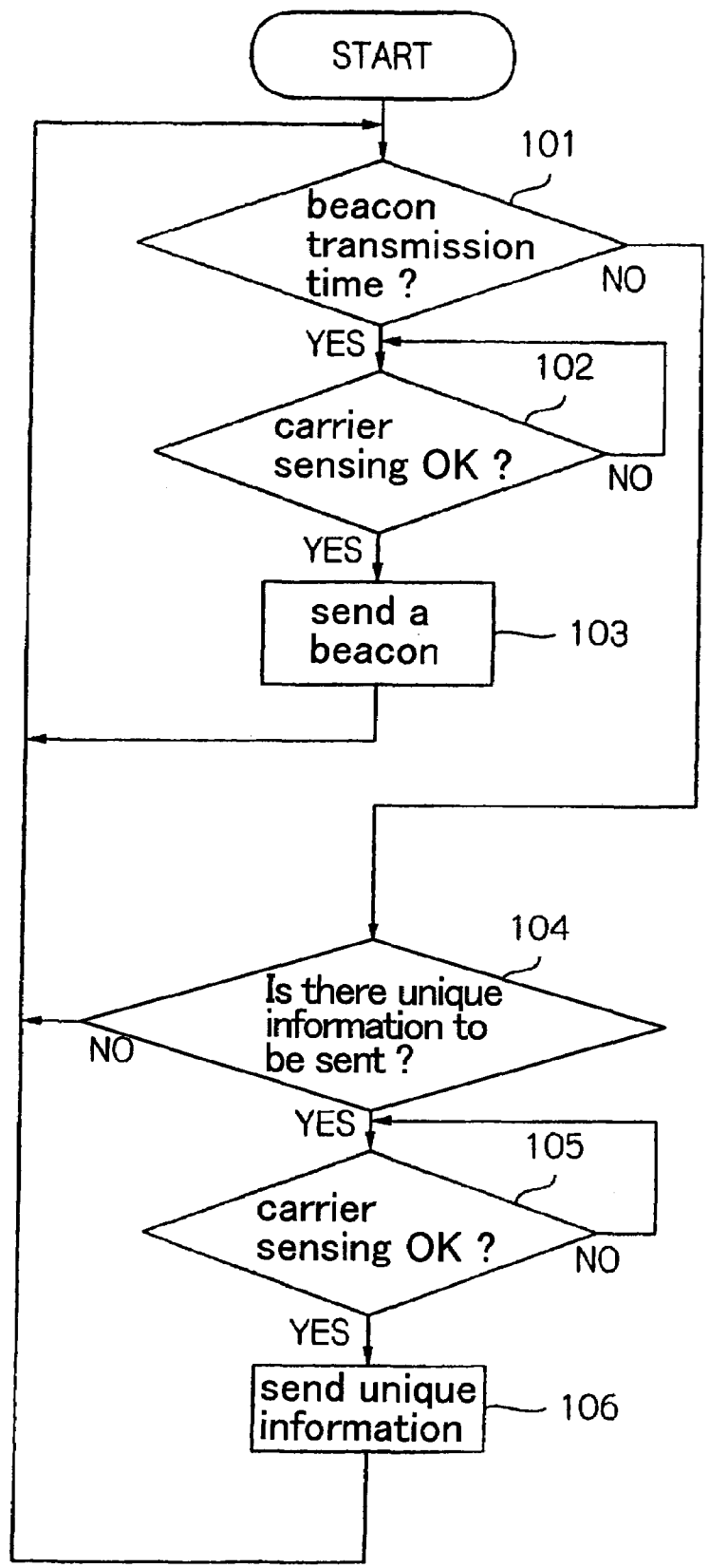
FIG. 7 is a flowchart of an operation sequence of the access point according to the embodiment.

FIG. 7 is a flowchart of an operation sequence of access point 11 according to the embodiment. Access point 11 sends unique information to terminal 13 via multicast communications at timing different from beacon transmission timing.

As shown in FIG. 7, access point 11 determines whether the present time is a beacon transmission time or not in step 101. If the present time is a beacon transmission time, then access point 11 performs a carrier sensing process to determine whether there is another device using the wireless medium of a channel that is currently be used or not in step 102. If there is another device using the wireless medium of a channel that is currently be used, then access point 11 waits until the other device is gone.

If there is no other device using the wireless medium of a channel that is currently be used (carrier sensing is OK), then access point 11 sends a beacon frame in step 103.

If it is judged in step 101 that the present time is not a beacon transmission time, then access point 11 determines whether there is unique information to be sent via multicast communications or not in step 104. If there is no unique information to be sent via multicast communications, then control goes back to step 101.

If it is judged in step 104 that there is unique information to be sent via multicast communications, then access point 11 performs a carrier sensing process to determine whether there is another device using the wireless medium of a channel that is currently be used or not in step 105. If there is another device using the wireless medium of a channel that is currently be used, then access point 11 waits until the other device is gone.

If there is no other device using the wireless medium of a channel that is currently be used (carrier sensing is OK), then access point 11 sends unique information via multicast communications in step 106.

Figure 8:
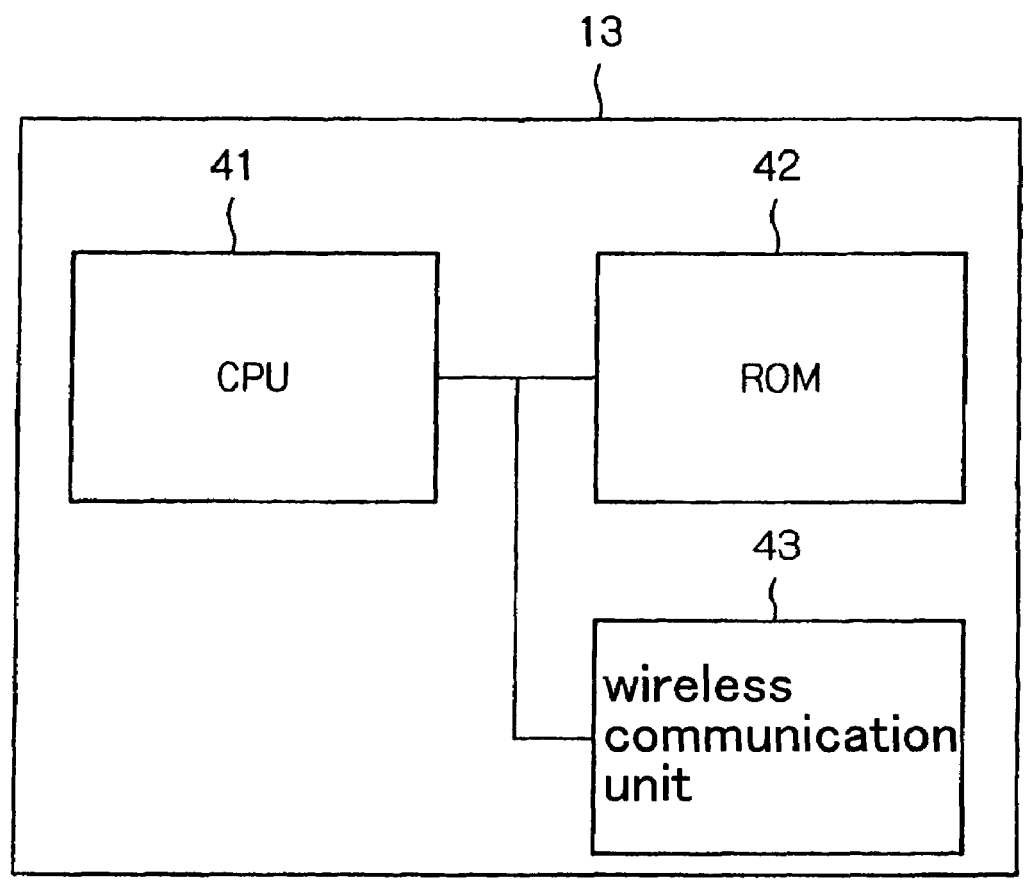
FIG. 8 is a block diagram showing a physical structure of a terminal which is capable of unique multicast communications according to the embodiment.

FIG. 8 shows in block form a physical structure of terminal 13 which is capable of unique multicast communications according to the embodiment. As shown in FIG. 8, terminal 13 has CPU 41, ROM 42, and wireless communication unit 43. CPU 41 controls terminal 13 in its entirety by executing a program. ROM 42 stores the program that is executed by CPU 41. Wireless communication unit 43 performs wireless communications with access point 11 under the control of CPU 41. Terminal 13 thus operates under the control of CPU 41.

Figure 9:
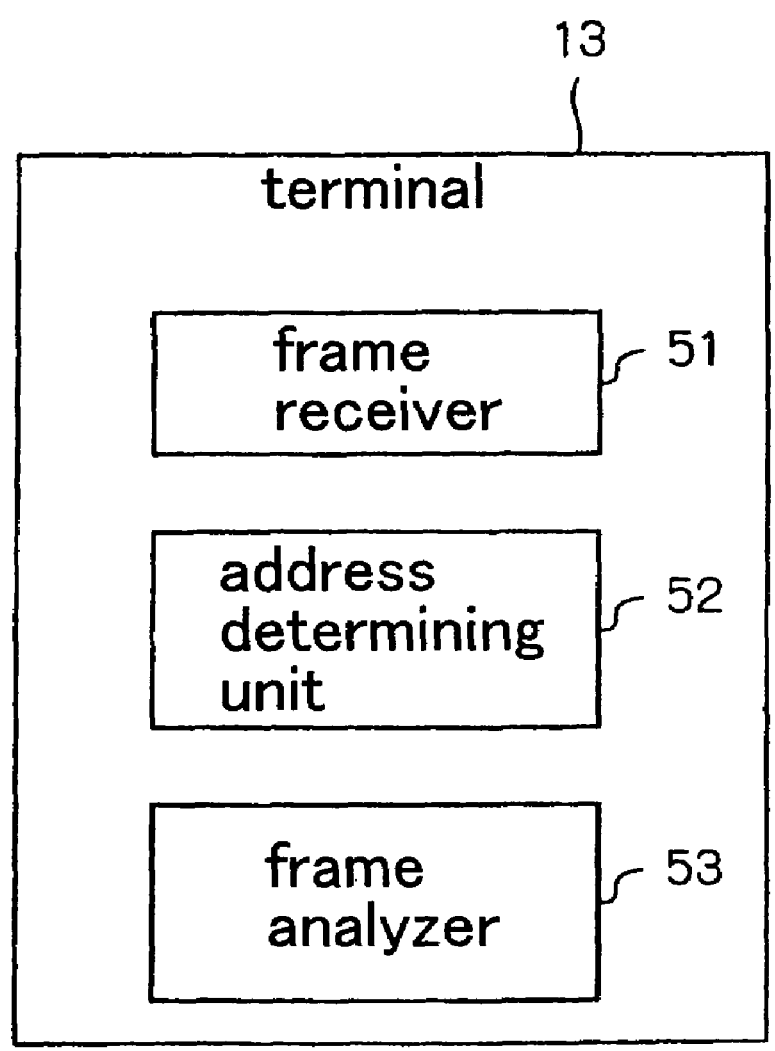
FIG. 9 is a block diagram showing a functional structure of the terminal which is capable of unique multicast communications according to the embodiment.

FIG. 9 shows in block form a functional structure of terminal 13 which is capable of unique multicast communications according to the embodiment. As shown in FIG. 9, terminal 13 has frame receiver 51, address determining unit 52, and frame analyzer 53.

Frame receiver 51 receives a frame sent from access point 11.

Address determining unit 52 analyzes the destination address of the frame received by frame receiver 51. If the destination address is an inherent address of its own, a broadcast address, or a multicast address, then address determining unit 52 sends the frame to frame analyzer 53. If the destination address is another address, then address determining unit 52 discards the frame.

Frame analyzer 53 analyzes the frame from address determining unit 52, and acquires information contained in the frame.

Terminal 12 which is incapable of unique multicast communications according to the embodiment is of an arrangement similar to terminal 13, except that address determining unit 52 sends only frames whose destination address is an inherent address of its own or a broadcast address to frame analyzer 53.

Figure 10:
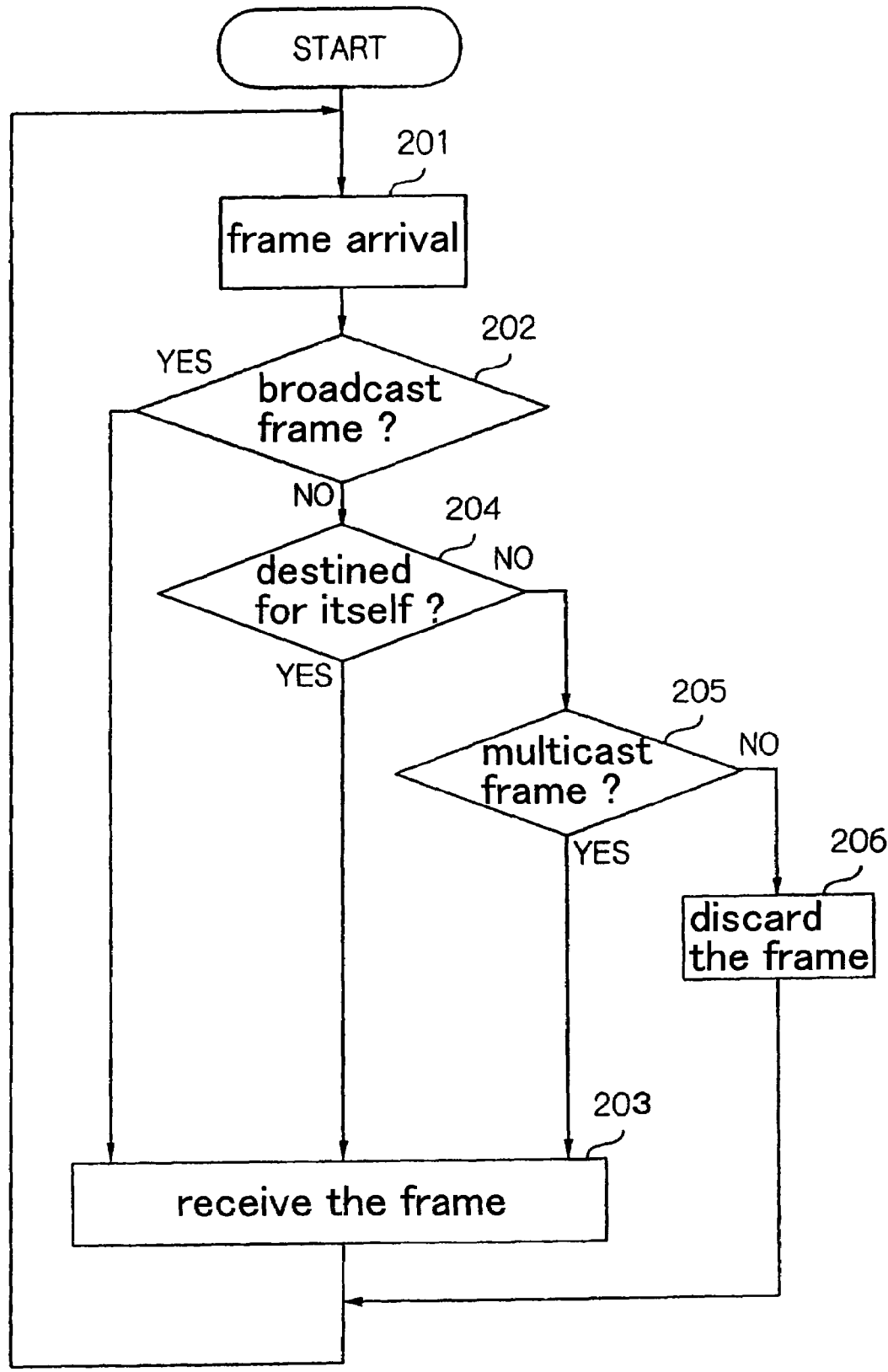
FIG. 10 is a flowchart of an operation sequence of the terminal which is capable of multicast communications according to the embodiment.

FIG. 10 is a flowchart of an operation sequence of terminal 13 which is capable of multicast communications according to the embodiment. As shown in FIG. 10, when a frame arrives at terminal 13 in step 201, terminal 13 determines whether the frame is a broadcast frame or not in step 202. If the frame is a broadcast frame, then terminal 13 receives the frame and acquires information contained in the frame in step 203. Then, control goes back to step 201.

If the frame is not a broadcast frame, then terminal 13 determines whether the frame is destined for itself or not in step 204. If the frame is destined for itself, then terminal 13 receives the frame and acquires information contained in the frame in step 203.

If it is judged in step 204 that the frame is not destined for itself, then terminal 13 determines whether the frame is a multicast frame or not in step 205. If the frame is a multicast frame, then terminal 13 receives the frame and acquires information contained in the frame in step 203.

If it is judged in step 205 that the frame is not a multicast frame, then terminal 13 discards the frame in step 206. Then, control goes back to step 201.

Figure 11:
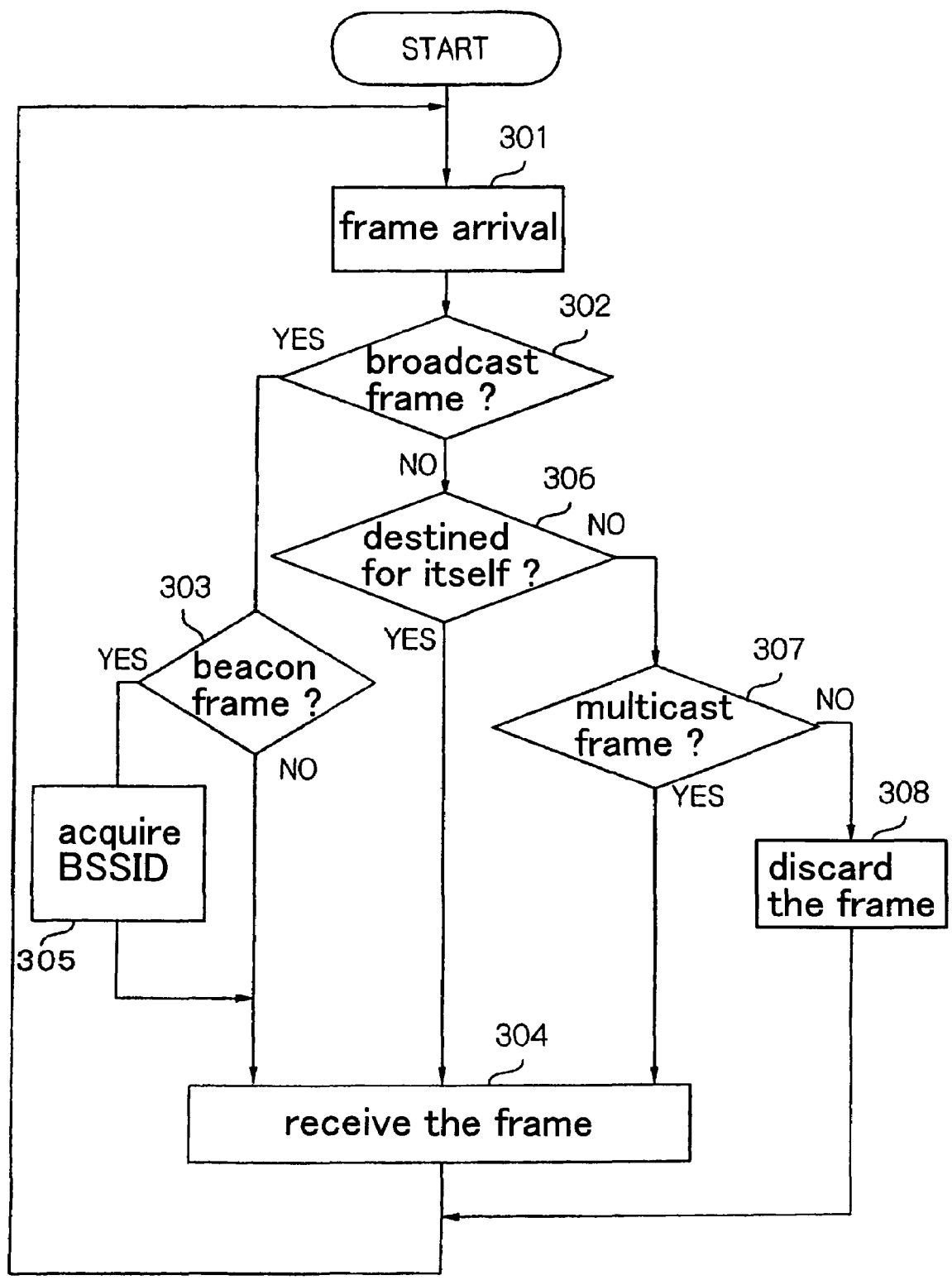
FIG. 11 is a flowchart of another operation sequence of the terminal which is capable of multicast communications according to the embodiment.

FIG. 11 is a flowchart of another operation sequence of terminal 13 which is capable of multicast communications according to the embodiment. In the operation sequence shown in FIG. 11, a MAC address on the wireless side of access point 11, which is set in the BSSID field of the beacon frame, is set as a multicast address, and terminal 13 acquires the multicast address from the BSSID field.

As shown in FIG. 11, when a frame arrives at terminal 13 in step 301, terminal 13 determines whether the frame is a broadcast frame or not in step 302. If the frame is a broadcast frame, then terminal 13 determines whether the broadcast frame is a beacon frame or not in step 303.

If the broadcast frame is not a beacon frame, then terminal 13 receives the frame and acquires information contained in the frame in step 304. Then, control goes back step 301.

If it is judged in step 303 that the broadcast frame is a beacon frame, then terminal 13 acquires the multicast address from the BSSID field of the frame in step 305. Then, terminal 13 receives the frame and acquires information contained in the frame in step 304.

If it is judged in step 302 that the frame is not a broadcast frame, then terminal 13 determines whether the frame is destined for itself or not in step 306. If the frame is destined for itself, then terminal 13 receives the frame and acquires information contained in the frame in step 304.

If it is judged in step 306 that the frame is not destined for itself, then terminal 13 determines whether the frame is a multicast frame or not in step 307. If the frame is a multicast frame, then terminal 13 receives the frame and acquires information contained in the frame in step 304.

If it is judged in step 307 that the frame is not a multicast frame, then terminal 13 discards the frame in step 308. Then, control goes back to step 301.

Figure 12:
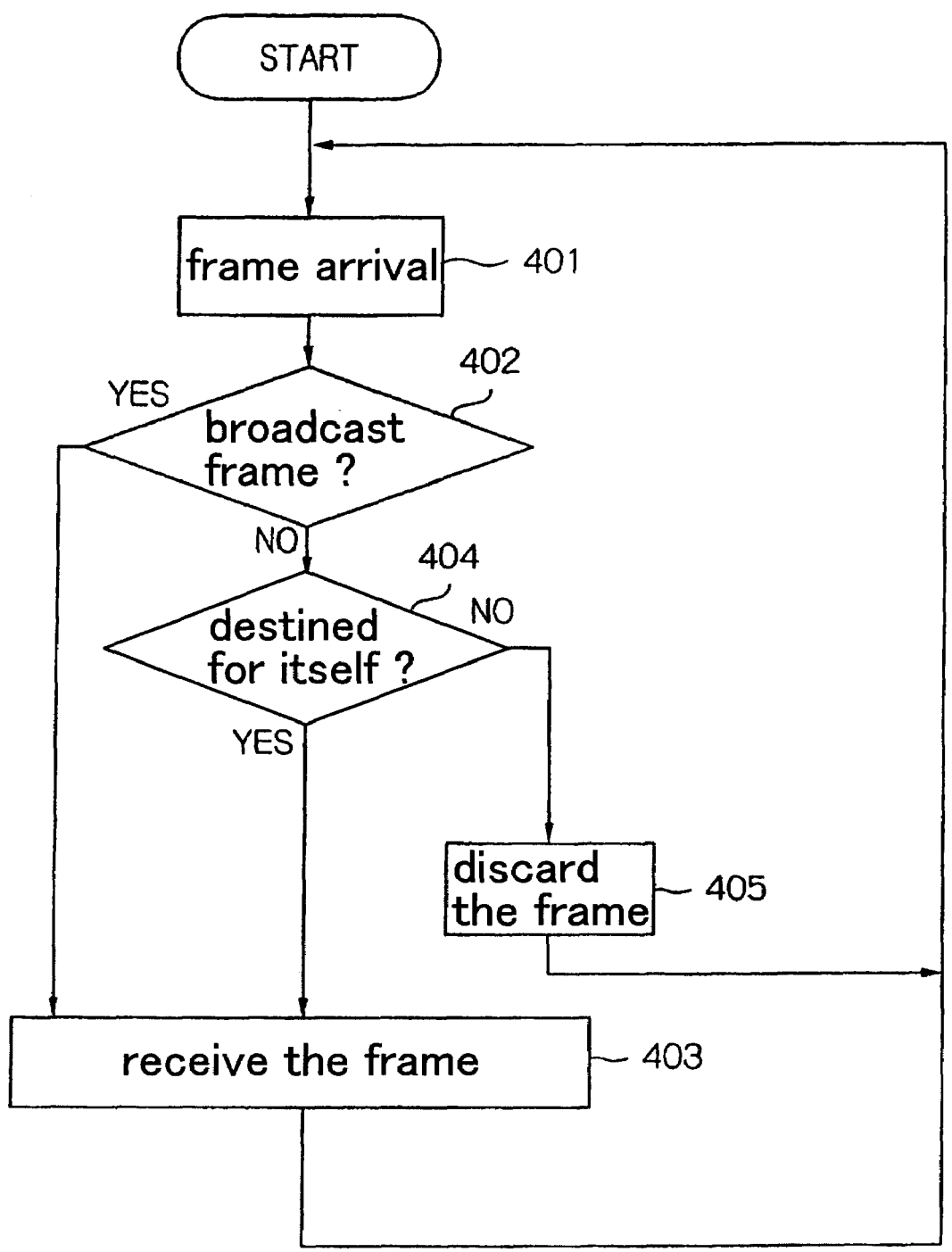
FIG. 12 is a flowchart of an operation sequence of a terminal which is incapable of multicast communications according to the embodiment.

FIG. 12 is a flowchart of an operation sequence of terminal 12 which is incapable of multicast communications according to the embodiment. As shown in FIG. 12, when a frame arrives at terminal 12 in step 401, terminal 12 determines whether the frame is a broadcast frame or not in step 402. If the frame is a broadcast frame, then terminal 12 receives the frame and acquires information contained in the frame in step 403. Then, control goes back to step 401.

If it is judged in step 402 that the frame is not a broadcast frame, then terminal 13 determines whether the frame is destined for itself or not in step 404. If the frame is destined for itself, then terminal 13 receives the frame and acquires information contained in the frame in step 403.

If it is judged in step 404 that the frame is not destined for itself, then terminal 13 discards the frame in step 405. Then, control goes back to step 401.

Figure 13:
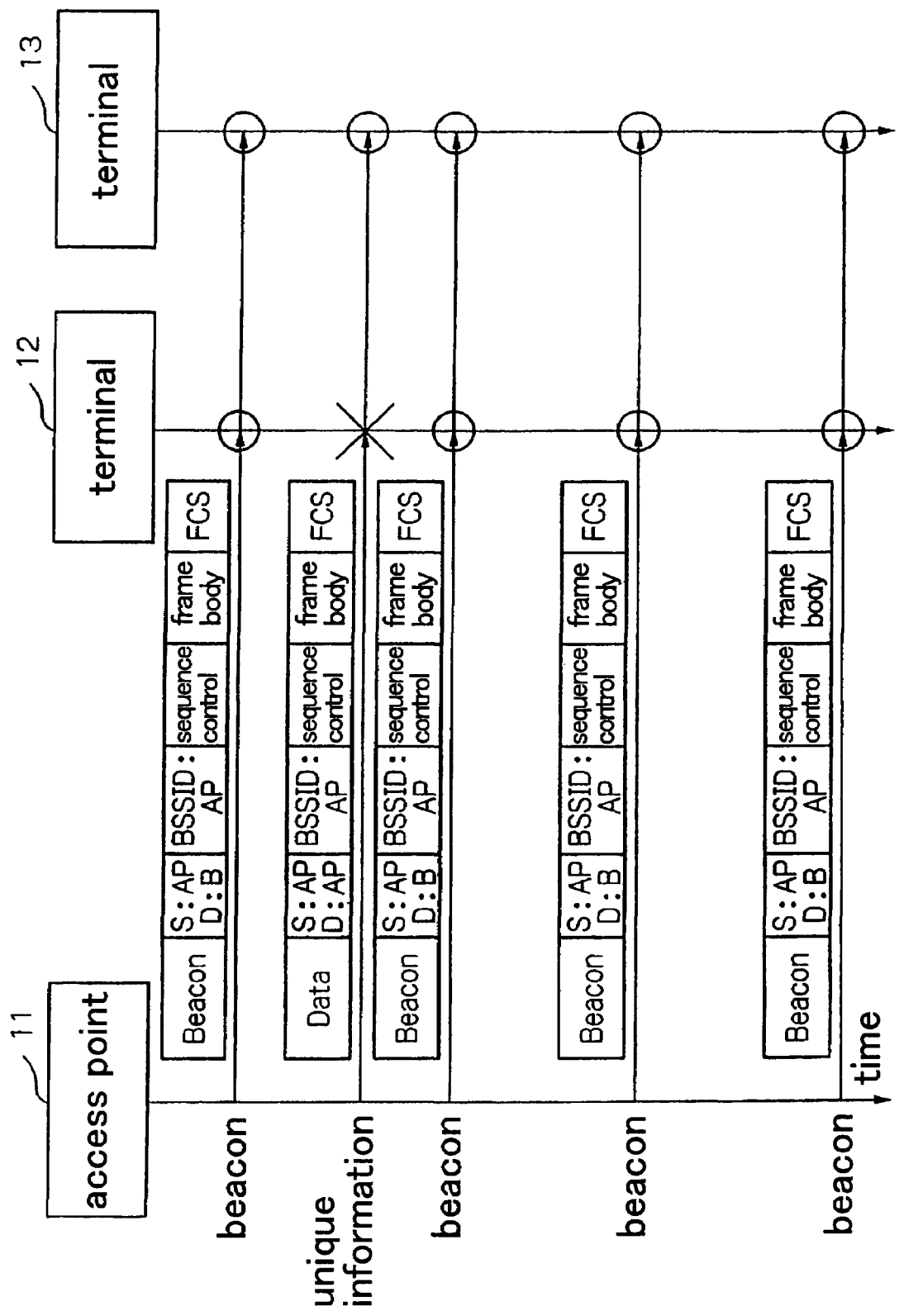
FIG. 13 is a sequence diagram showing the manner in which the wireless LAN system according to the embodiment operates.

FIG. 13 is a sequence diagram showing the manner in which the wireless LAN system according to the embodiment operates. In FIG. 13, access point 11 sends unique information via multicast communications at a time other than a beacon frame transmission time. A beacon frame is to be broadcast and has a broadcast address (denoted by "B" in FIG. 13) as a destination address. A frame of unique information is to be multicast and has a multicast address (denoted by "AP" in FIG. 13) as a destination address.

Terminal 12 that does not have a multicast communication function receives a broadcast beacon frame, but does not receive multicast unique information. On the other hand, terminal 13 that has a multicast communication function receives both a broadcast beacon frame and multicast unique information.

According to the present embodiment, as described above, access point 11 generates a unique multicast frame according to the standard frame format, using an address used by another device than terminals connected to the wireless LAN of its own, as a destination address, and sends the generated unique multicast frame. Terminal 13 which stores in advance the multicast destination address receives the frame with the multicast destination address set therein. Therefore, centralized management for avoiding multicast address overlaps is not required, and multicast communications can be performed without adversely affecting other systems and terminals.

Access point 11 sends in advance a multicast address to a special terminal, i.e., terminal 13, and terminal 13 stores the multicast address sent thereto. Therefore, the user does not need to manually set the multicast address in individual terminals 13.

A multicast address is the address of access point 11 itself or the address of another device that access point 11 can acquire from the wired side. Consequently, access point 11 itself can determine a multicast address without the need for the user to manually set a multicast address in access point 11.

Access point 11 repeatedly sends the address on the wireless side of its own in the BSSID field of a beacon frame, and terminal 13 acquires a multicast address from the beacon frame. Therefore, the multicast address can be sent without the need for a new means for sending the multicast address from access point 11 to terminal 13.

While preferred embodiments of the present invention have been described using specific terms, such description is for illustrative purposes only, and it is to be understood that changes and variations may be made without departing from the spirit or scope of the following claims.

What is claimed is:

1. A wireless LAN system for multicast communications, comprising:

an access point for generating a unique multicast frame, which is to be discarded by an ordinary terminal, using an address that is used by a device other than terminals connected to a wireless LAN of the access point as a multicast destination address in the wireless LAN, with the multicast destination address being set as a destination address according to a standard frame format, and sending the generated unique multicast frame through a wireless link; and a special terminal for storing said multicast destination address in advance and receiving a frame from said access point as a unique multicast frame if said multicast destination address is set as a destination address of the frame.

2. A wireless LAN system according to claim 1, wherein said access point sends said multicast destination address in advance to said special terminal, and said special terminal stores said multicast destination address sent from said access point.

3. A wireless LAN system according to claim 1, wherein said multicast destination address comprises an address of said access point itself or an address of another device which said access point can acquire from a wired side.

4. A wireless LAN system according to claim 3, wherein said multicast destination address comprises an address on a wireless side of said access point itself.

5. A wireless LAN system according to claim 4, wherein said access point repeatedly sends the address on the wireless side of said access point itself as said multicast destination address on a beacon frame, and said special terminal acquires the address on the wireless side of said access point from said beacon frame received from said access point as said multicast destination address.

6. A wireless LAN system according to claim 1, wherein said access point employs a standard frame format for data frames as a format for said multicast frame.

7. A wireless LAN system according to claim 1, wherein said access point employs a standard frame format for beacon frames as a format for said multicast frame.

8. A wireless LAN system according to claim 1, wherein said access point sends said multicast frame at a time different from a time for periodically sending frames.

9. An access point in a wireless LAN system for multicast communications, comprising:

a frame generator for generating a multicast frame according to a standard frame format;

an address setting unit for setting an address that is used by a device other than terminals connected to a wireless LAN of the access point, as a multicast destination address, with the multicast destination address being set as a destination address of said multicast frame; and a frame generator for sending a unique multicast frame, which is to be discarded by an ordinary terminal, having said multicast destination address generated by said frame generator and set by said address setting unit, through a wireless link.

10. A terminal for receiving a multicast frame from an access point in a wireless LAN system, comprising:

a frame receiver for receiving a frame according to a standard frame format from said access point;

an address determining unit for storing in advance an address that is used by a device other than terminals connected to a wireless LAN of said access point, as a multicast destination address, and judging the frame received by said frame receiver as a unique multicast frame, which is to be discarded by an ordinary terminal, if said multicast destination address is set as a destination address of said frame; and a frame analyzer for analyzing the frame judged as said unique multicast frame by said address determining unit, and acquiring information contained in said frame.

11. A method of performing multicast communications in a wireless LAN system for multicast communications from an access point to a special terminal, comprising:

setting an address comprising an address that is used by a device other than terminals connected to a wireless LAN of said access point as a multicast destination address in the wireless LAN, said access point being coupled to the special terminal and an ordinary terminal;

storing in advance said multicast destination address in said special terminal;

generating a unique multicast frame, having said multicast destination address set as a destination address according to a standard frame format, by said access point;

sending the generated unique multicast frame from said access point through a wireless link; and receiving said unique multicast frame from said access point in said special terminal and discarding unique multicast frame by the ordinary terminal.

12. The method according to claim 11, further including:

prior to storing, retrieving the address to serve as the multicast destination address by the special terminal from the standard frame received from the access point.

13. The method according to claim 12, wherein the standard frame comprises a beacon frame comprising the address to serve as the multicast destination address in a basic service set identification device (BSSID) field.

14. The system according to claim 1, wherein the ordinary terminal, which is prevented from receiving the multicast communications, and the special terminal, which is enabled to receive the multicast communications, are wirelessly connected to the access point.

15. The system according to claim 1, wherein the standard frame format includes an IEEE 802.11 general data frame format in which the multicast address is recorded in a destination address field.

16. The system according to claim 1, wherein the standard frame format includes an IEEE 802.11 general beacon frame format in which the multicast address is recorded in a destination address field.

17. The system according to claim 1, wherein the access point determines the multicast destination address in advance and wherein the special terminal retrieves the multicast destination address from a standard frame received from the access point.

18. The system according to claim 17, wherein the special terminal retrieves the multicast destination address from a basic service set identification device (BSSID) field of a beacon frame.

19. The system according to claim 18, wherein the multicast destination address comprises a media access control (MAC) address of the access point.

* * * * *